Patented June 18, 1946

2,402,198

UNITED STATES PATENT OFFICE 2,402,198

PREPARATION OF OXAZOLINES

Donald J. Loder, Wilmington, Del., assignor to E. I. du Pont de Nemours & Company, Wilmington, Del., a corporation of Delaware No Drawing. Application September 6, 1944, Serial No. 552,931

6 Claims. (Cl. 260—307)

This invention relates to a process for the preparation of oxazolines and more particularly to their preparation by the reaction of nitriles with monoethanolamine.

The invention relates to a process for the preparation of new compositions of matter. Another object relates to a process for the preparation of oxazolines by the reaction of an alkyl, aryl, alkoxyalkane, or alkoxyalkoxyalkane nitrile with monoethanolamine in the presence of a suitable catalyst for the reaction. Yet another object is to provide a process for the preparation of 2-((alkoxymethoxy)alkyl)oxazolines by the interaction of (alkoxymethoxy)ethane nitriles with monoethanolamine. Other objects and advantages of the invention will hereinafter appear.

The above and other objects of the invention are realized by charging a suitable reaction vessel with monoethanolamine, an alkyl, aryl, alkoxyalkane, or alkoxyalkoxyalkane nitrile and a suitable catalyst for the reaction. Heat is applied and as the reaction proceeds, ammonia is evolved. The reaction mixture may be distilled without reflux at reduced pressure and the distillate fractionally redistilled for the removal of the unchanged nitrile, ethanolamine and the separation therefrom of the oxazoline.

The reaction may be generically illustrated by the equation:

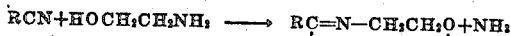

in which R designates an alkyl group, an aryl group, an alkoxyalkane group, or an alkoxyalkoxyalkane group. More specifically, the reaction may be illustrated by this equation:

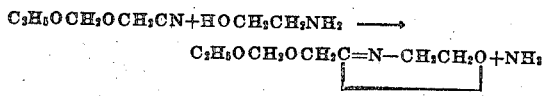

which illustrates the formation of 2-((ethoxymethoxy)methyl)oxazoline by the interaction of (ethoxymethoxy)ethane nitrile with ethanolamine.

The reaction is initiated by heating the nitrile and the ethanolamine and is conducted preferably at temperature ranging between 50° C. and 150° C. Reduced or elevated pressures may be used, although satisfactory results are obtained by operating at atmospheric pressures. Inasmuch as the reaction involves the chemical combination of one mole of the nitrile with 1 mole of the ethanolamine equimolar proportions give excellent results, although, if desired, there may be employed from 0.25 to 1½ moles of the ethanolamine per mole of the nitrile.

The reaction proceeds but slowly in the absence of a catalyst and can be accelerated by the use of such catalysts as the alkali metal and alkaline earth metal alkoxides such, for example, as sodium methoxide, sodium ethoxide and the like, as well as such alkaline catalysts as calcium oxide, barium oxide and calcium hydroxide.

The oxazoline may be separated from the reaction mixture by distillation, preferably under a pressure in the order of 10 to 15 mm. or less, the distillate being fractionated under reduced pressure to recover the oxazoline.

The examples illustrate preferred embodiments of the invention in which parts are by weight unless otherwise indicated.

*Example I.*—A silver-lined reaction vessel was charged with 0.5 M. of (ethoxymethoxy)ethane nitrile, 0.5 M. of monomethanolamine and about 1%, based on the total weight of reactants, of sodium methoxide. The resulting mixture was heated for about 1 hour and as the temperature rose to about 125° C. ammonia was evolved. After the evolution of ammonia had substantially ceased, the reaction mixture was distilled at reduced pressure (about 2 mm.) and the distillate fractionally redistilled under substantially the same pressure. The unreacted (ethoxymethoxy)ethane nitrile and ethanolamine were separated and 2-((ethoxymethoxy)methyl)oxazoline was obtained in a yield of approximately 32%. This oxazoline boils at 57° C. under 2 mm. pressure, is a water-soluble, nearly colorless oil having a R. I. at 25° C. of 1.4472 and a neutral equivalent of 161.7.

*Example II.*—The process of Example I was repeated using 13.1 parts of (ethoxymethoxyl)ethane nitrile, 118.0 parts of methanol, 0.1 part of sodium methoxide and 6.95 parts of ethanolamine, the ethanolamine in this case being added slowly to a solution of the other components. The mixture was then refluxed at 70° C. for about 1 hour. The product was fractionally distilled under reduced pressure and 9 parts of 2-((ethoxymethoxy)methyl) oxazoline obtained.

In lieu of preparing the oxazolines described in the examples other oxazolines can be prepared by substituting in place of the nitriles used in the examples alkyl nitriles such, for example, as methyl, ethyl, normal- and isopropyl and the higher symmetrical and unsymmetrical alkyl nitriles; aryl nitriles such as benzyl, phenyl and naphthyl nitriles; alkoxyalkane nitriles such as (methoxyethane-, ethoxyethane-, ethoxypropanenitriles; and higher nitriles of this class as well as the (alkoxyalkoxy)alkane nitriles such as (methoxymethoxy)ethane nitrile, (ethoxymethoxy)ethane nitrile, (propoxymethoxy)ethane nitrile and the like.

I claim:

1. A process for the preparation of oxazolines which comprises subjecting monoethanolamine to a reaction with a compound selected from the group consisting of alkyl, aryl, alkoxyalkane, and (alkoxyalkoxy)alkane nitriles in the presence of an alkaline catalyst the reaction being effected at a temperature between 50 and 150° C. there being present from 0.25 to 1.5 mols of monoethanolamine per mol of the nitrile.

2. A process for the preparation of oxazolines which comprises subjecting monoethanolamine to a reaction with an alkoxyethane nitrile in the presence of an alkaline catalyst the reaction being effected at a temperature between 50 and 150° C. there being present from 0.25 to 1.5 mols of monoethanol amine per mol of the alkoxy ethane nitrile.

3. A process for the preparation of a 2-((alkoxymethoxy)alkyl)oxazoline which comprises subjecting monoethanolamine to a reaction with an (alkoxymethoxy)ethane nitrile in the presence of an alkaline catalyst the reaction being effected at a temperature between 50 and 150° C. there being present from 0.25 to 1.5 mols of monoethanol amine per mol of the (alkoxymethoxy) ethane nitrile.

4. A process for the preparation of 2-((methoxymethoxy)methyl) oxazoline which comprises subjecting monoethanolamine to a reaction with (methoxymethoxy)ethane nitrile at a temperature between 50 and 150° C. and in the presence of a metal alkoxide catalyst there being present from 0.25 to 1.5 mols of monoethanol amine per mol of the (methoxymethoxy) ethane nitrile.

5. A process for the preparation of 2-((ethoxymethoxy)methyl)oxazoline which comprises subjecting monoethanolamine to a reaction with (methoxymethoxy) ethane nitrile at a temperature of 125° C. and in the presence of sodium methoxide as the catalyst there being present from 0.25 to 1.5 mols of monoethanol amine per mole of the (methoxymethoxy) ethane nitrile.

6. 2-((ethoxymethoxy)methyl)oxazoline.

DONALD J. LODER.